May 26, 1925.  
F. R. DEURING  
MILLING MACHINE  
Filed June 29, 1920   2 Sheets-Sheet 1  
1,539,471

Inventor  
Fritz R. Deuring

May 26, 1925. 1,539,471
F. R. DEURING
MILLING MACHINE
Filed June 29, 1920 2 Sheets-Sheet 2

Inventor
Fritz R. Deuring
By Knight Bros
Attorneys

Patented May 26, 1925.

1,539,471

UNITED STATES PATENT OFFICE.

FRITZ RICHARD DEURING, OF M. GLADBACH, GERMANY.

MILLING MACHINE.

Application filed June 29, 1920. Serial No. 392,904.

*To all whom it may concern:*

Be it known that I, FRITZ RICHARD DEURING, citizen of the German Republic, residing at M. Gladbach, Hohenzollernstrasse 134, Germany, have invented certain new and useful Improvements in Milling Machines (for which I have filed an application in Germany Dec. 5, 1917, No. 307,739, dated Oct. 1, 1920), of which the following is a specification.

It has hitherto been usual, in milling machines to have the work-holder arranged to move under the tool, or the tool over the work-holder. The work-holder has been in the form of a carriage, or of two carriages side by side, or of a rotatable ring. If there is only one work holder the milling machines must stop, or be put out of action, while the work is put on or taken off. This drawback is obviated by the arrangement of two work holders side by side, because one of them can be unloaded and reloaded while work is being done on the other. The ring-shaped work-holder also obviates the said disadvantage, as while it is being moved step by step one part of it can always be unloaded and reloaded. The ring-shaped workholder, however, has the disadvantage that work of an angular or polygonal basic shape cannot be directly worked on at the side, because the cutting at the side is not rectilinear but curved. Moreover, all milling machines hitherto known have one important disadvantage, namely that the shavings lie upon the work and cover the setting devices, so that after each operation the work and setting devices must be cleaned, which frequently takes a good deal of time, and if it is not done thoroughly leads to inaccuracy in the setting of fresh work.

The present invention obviates these disadvantages. It consists in mounting the work-holder over the cutter, giving it a prismatic or polygonal shape, and making it rotatable on a horizontal spindle, so that while the work is treated on one side the other side can be unloaded and reloaded.

Figure 1:
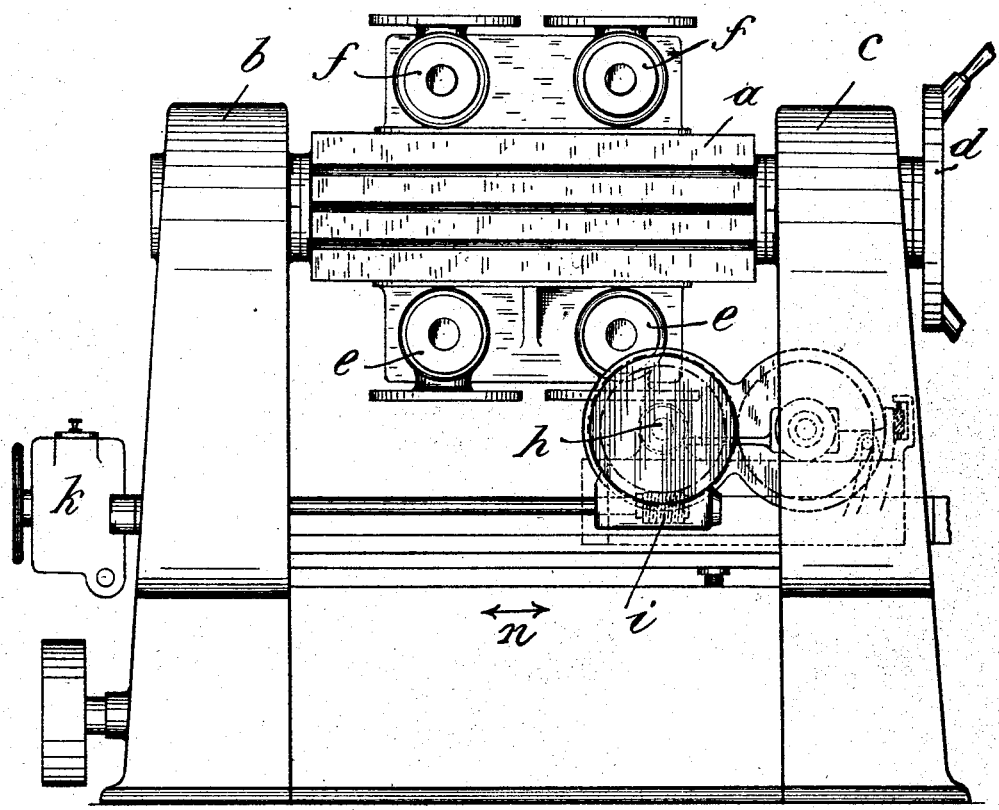
Figure 2:
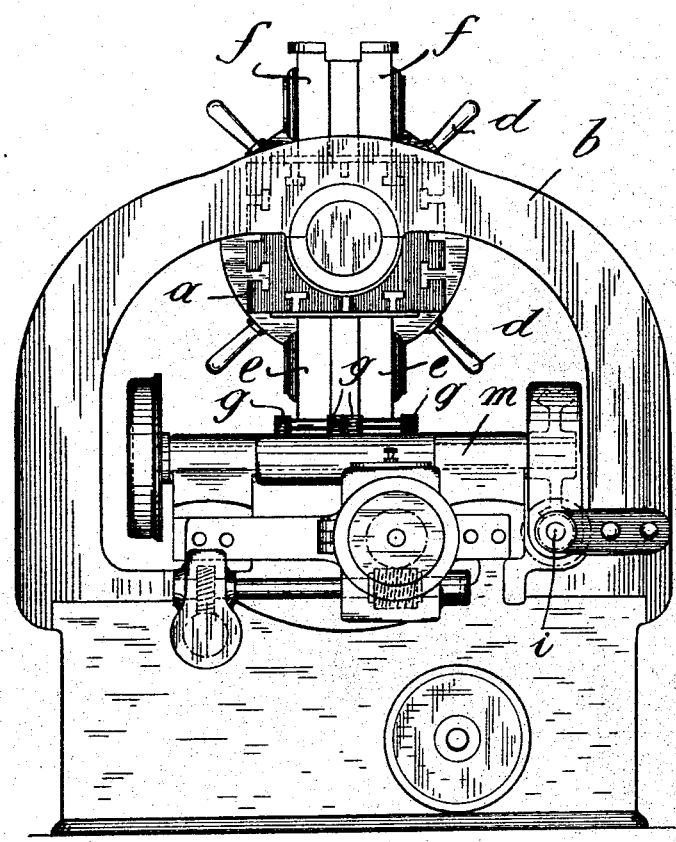

The invention is illustrated in the annexed drawings, in which Fig. 1 is a side view of a milling machine embodying the present invention and Fig. 2 is an end view of same.

In the drawing $a$ designates the work holder or revolver head, which is for example quadrangular in cross-section and can be rotated in bearings $b$ $c$ by means of a wheel $d$ on a horizontal spindle. $e$ designates the work under treatment, and $f$ the work which is finished or still to be treated. The cutter or cutters $g$ are mounted on a horizontal mandrel, in the example on the mandrel $h$, which is driven by the electromotor $k$ or by transmission gear. The mounting and drive of the carriage $m$ supporting the cutters and actuating gear may be of any suitable kind, and for simplicity no further particulars of this part of the apparatus will be given, as it has nothing to do with the principle of the invention. In all cases the cutters are reciprocated under the work-holder in the direction of the arrows $n$ and deal with the work, either at the face directed towards the cutters or also at the sides.

In all cases the shavings taken off the work drop down, so that the work and the setting devices remain free of shavings, and after turning the revolver head it can at once be reloaded, without inconvenience or danger to the operator, while the downwardly directed work is being treated.

Having now particularly described and ascertained the nature of my said invention, what I claim to be new, and desire to secure by Letters Patent, is:

1. In a milling machine, a work-holding revolver head, means for attaching a plurality of separate work pieces to said revolver head, a milling tool disposed below said revolver head, means for reciprocating said tool in required relation to said revolver head, and means for progressively bringing said work pieces into the path of said tool.

2. In a milling machine, a prismatic work holding revolver head, axially disposed journals for supporting said revolver head in longitudinal position, a tool adapted to reciprocate beneath said revolver head and in an axial direction relative thereto, means for fixing work pieces on the faces of said revolver head, and means for rotating said revolver head for bringing the work pieces successively into the path of said tool.

In testimony whereof the foregoing specification is signed.

FRITZ RICHARD DEURING.